United States Patent [19]

Bohm et al.

[11] Patent Number: 5,474,645

[45] Date of Patent: Dec. 12, 1995

[54] APPARATUS FOR APPLYING PREMOLDED TIRE SIDEWALL APPLIQUES

[75] Inventors: Georg G. A. Bohm, Akron; Arthur E. Oberster, North Canton, both of Ohio

[73] Assignee: Bridgeston/Firetone, Inc., Akron, Ohio

[21] Appl. No.: 469,705

[22] Filed: Jan. 24, 1990

Related U.S. Application Data

[63] Continuation of Ser. No. 223,195, Jul. 8, 1988, abandoned.

[51] Int. Cl.$^6$ ............................ B29C 35/00; B29D 30/72
[52] U.S. Cl. ............. 156/395; 152/524; 152/DIG.12; 156/116; 156/394.1; 156/540; 249/83; 249/96; 425/28.1; 425/501
[58] Field of Search .................. 156/116, 240, 156/395, 394.1, 540, 406.2; 264/248; 152/524, DIG. 12; 425/17, 28.1, 32, 33, 35, 36, 44, 500, 501, 508, 517, 518, 519; 226/152; 249/83, 96

[56] References Cited

U.S. PATENT DOCUMENTS

| 1,371,501 | 3/1921 | McLane | 152/DIG. 12 X |
|---|---|---|---|
| 1,445,745 | 2/1923 | Burke | 425/28.1 X |
| 2,290,365 | 7/1942 | Wynne | 156/540 X |
| 2,295,438 | 9/1942 | Vaniman | 156/116 X |
| 2,979,099 | 4/1961 | Rowe | 152/524 |
| 3,113,902 | 12/1963 | Dismuke | 156/116 X |
| 3,329,551 | 7/1967 | Hutchinson | 156/394.1 |
| 4,222,810 | 9/1980 | Ytterström | 156/395 |
| 4,413,663 | 11/1983 | Sullenger | 152/524 X |
| 4,634,489 | 1/1987 | Dupommier | 156/406.2 X |
| 4,684,422 | 8/1987 | Roedseth | 156/406.2 X |
| 4,684,431 | 8/1987 | Shurman et al. | 156/394.1 |

FOREIGN PATENT DOCUMENTS

| 54-69190 | 6/1979 | Japan | 156/116 |
|---|---|---|---|
| 47210 | 10/1972 | U.S.S.R. | 425/28.1 |
| 0867225 | 5/1961 | United Kingdom | 156/240 |

*Primary Examiner*—Adrienne C. Johnstone
*Attorney, Agent, or Firm*—Daniel N. Hall

[57] ABSTRACT

A product and process for imparting decorative appliques to the sidewalls of tires during the curing operation are presented. A spool of applique composite material is maintained for feeding into a tire mold or onto a transfer device, thereby defining a ring for vulcanization to a tire. The applique consists of a laminate received upon a carrier, the laminate having a first barrier layer and a congruent second decorative layer. The laminate is received by a tire sidewall between two grooves which serve to isolate the decorative layer from the tire itself.

6 Claims, 3 Drawing Sheets

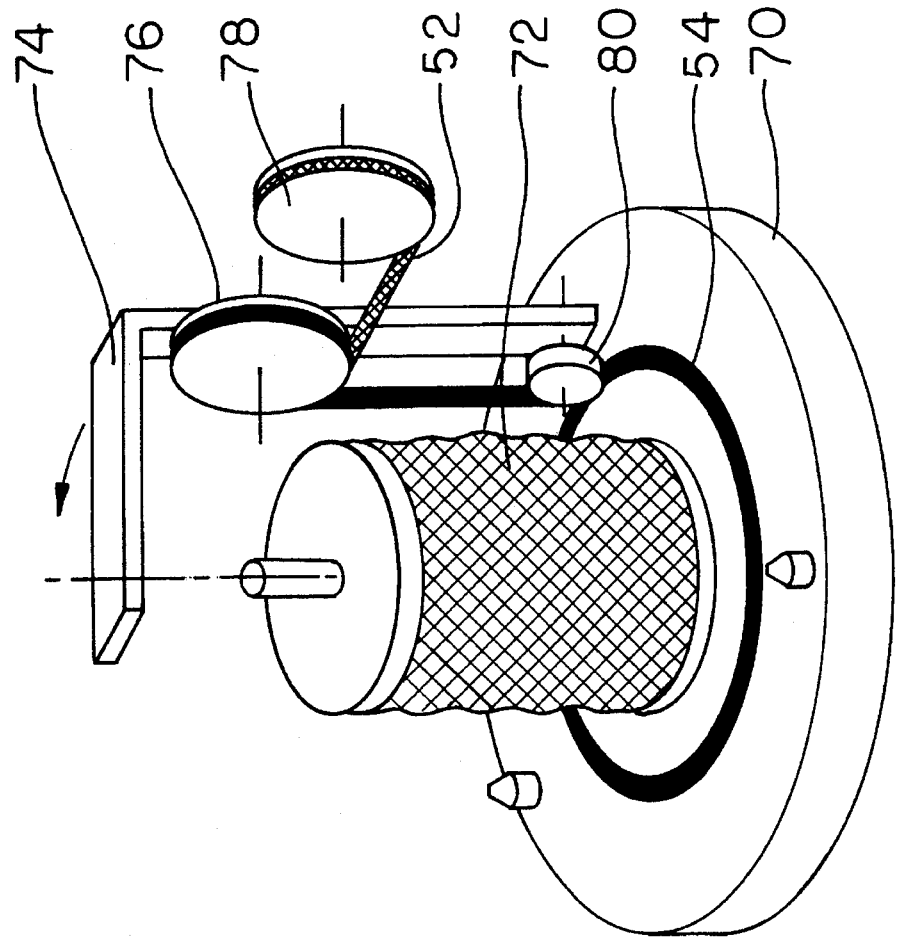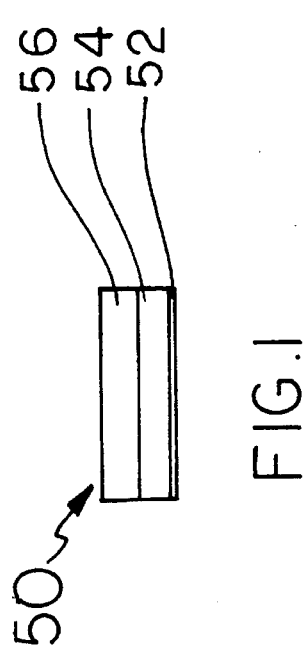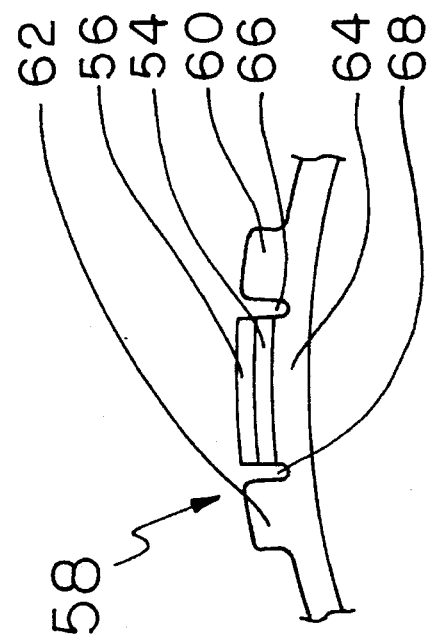

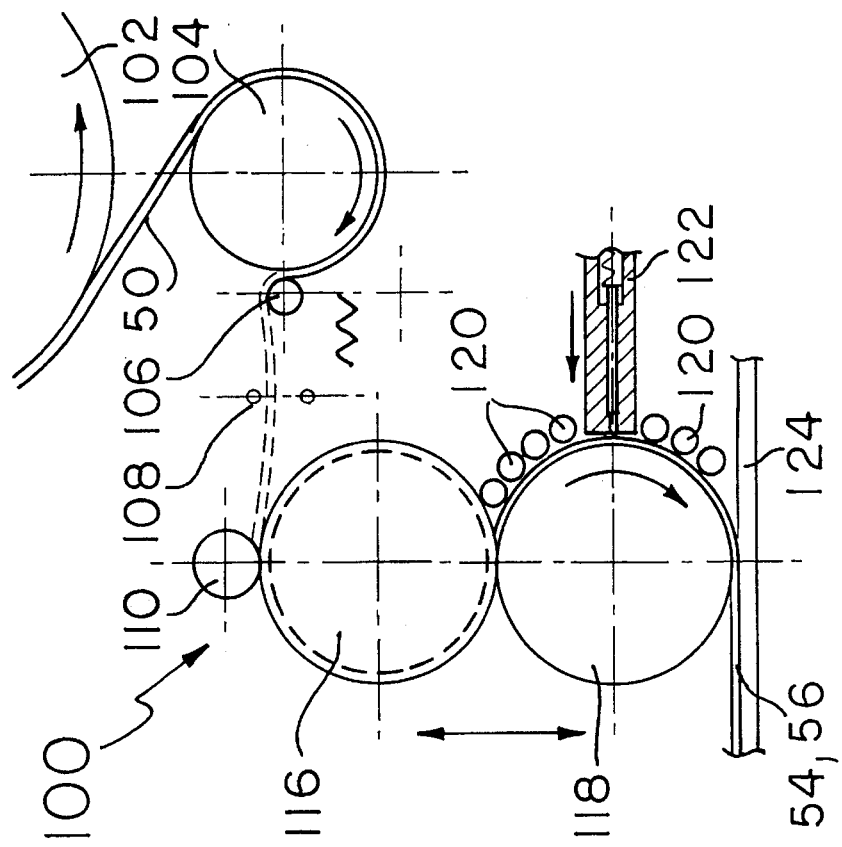
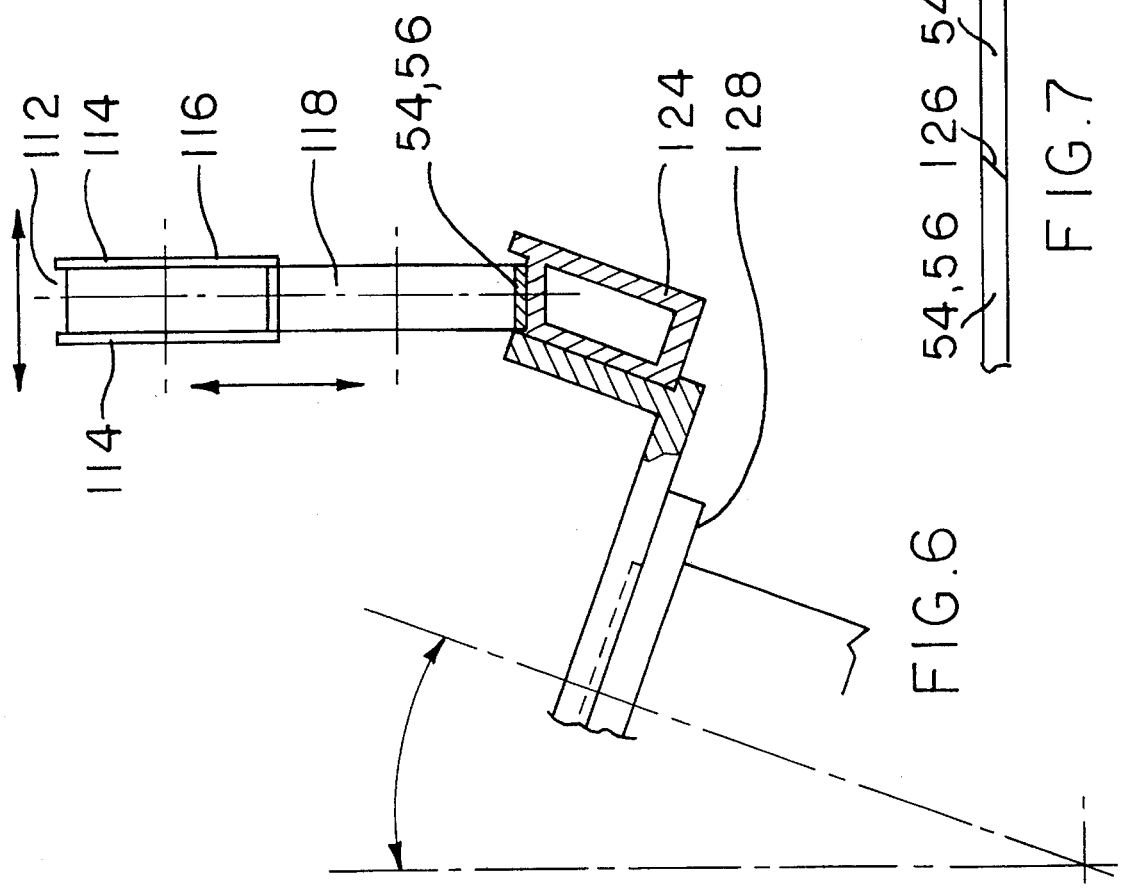

APPARATUS FOR APPLYING PREMOLDED TIRE SIDEWALL APPLIQUES

This is a continuation of application Ser. No. 223,195, filed Jul. 8, 1988, now abandoned.

TECHNICAL FIELD

The invention herein resides in the art of vehicle tires and, more particularly, such tires having decorative sidewalls. Specifically, the invention relates to a decorative sidewall in the form of a premolded or preshaped structure which is adapted to be applied and bonded to the sidewall of a tire during tire cure.

BACKGROUND ART

The manufacture of tires is signficantly complicated by the imparting of decorations onto one of the tire's sidewalls. Such decorations may take the form of strips, either singular or plural, logos, lettering, and the like. Presently, this is accomplished by fabrications using the extrusion and calendaring of a number of black and white components which are subsequently combined into a decorative sidewall preassembly. All the tire components, along with the tire sidewall preassembly, are then applied in sequence to the tire building drum to form the green or uncured tire. Following the tire curing operation, the decorative sidewall side of the tire is carefully ground and buffed to expose the decorative sidewall area which was previously protected by a cover strip. These complex steps detrimentally affect the efficiency of the tire manufacturing process. Further, many interfaces produced in construction of the decorative sidewall tire affect the structural integrity of the tire and its durability and performance on the road.

It is known in the tire industry that different tire carcasses must be formed for blackwall tires than those having decorative features on the sidewalls thereof. Heretofore, each has been constructed differently. Modern tires are designed with increasingly thinner sidewalls, such that the decorative portion of the sidewall is becoming an increasingly significant part of the tire sidewall structure itself. Since the decorative portion is typically less than optimum as a structural element, it is becoming increasingly difficult to manufacture modern tires having sidewalls with decorative features thereon. Previously known tires with decorative sidewalls have been characterized by a plurality of boundaries defining the different layers of the decorative structure, each boundary presenting an area for the development of a potential defect.

To obviate the shortcomings of the prior art, it has been proposed to replace the previously known sidewall decorative features with appliques of polymeric paint which are applied to stock blackwall tires prior to the curing operation on the tire. Such structures and techniques are taught in co-pending patent applications Ser. Nos. 766,227, 766,228, 766,385, and 766,388, all filed on Aug. 16, 1985 and assigned to The Firestone Tire and Rubber Company, the assignee of the instant application. The appliques of the copending patent applications are quite thin, on the order of 0.003 inch and, accordingly, susceptible to damage by scraping, scuffing, and the like. While the appliques are designed to be scuff resistant, and the tire receiving such appliques are configured to protect the same from scuffing, the inherent thin nature of the appliques gives rise to concern over damage resulting from use. Such applications have respectively issued into U.S. Pat. Nos. 4,767,481; 4,684, 420; 4,699,193; and 4,684,431.

DISCLOSURE OF THE INVENTION

In light of the foregoing, it is the first aspect of the invention to provide a tire having a decorative applique and a process for making the same in which a blackwall tire may be selectively employed.

Another aspect of the invention is the provision of a tire having a decorative applique and the process for making the same in which such process is a simple one, eliminating the steps and material previously used for co-extruding and assembling a sidewall band or decorative material.

Still a further aspect of the invention is the provision of a tire having a decorative applique and the process for making the same in which little or no waste is experienced in the manufacturing process.

An additional aspect of the invention is the provision of a tire having a decorative applique and the process for making the same which is given to numerous and varying designs, colors, configurations, and the like.

Another aspect of the invention is the provision of a tire having a decorative applique and the process for making the same in which tire integrity is enhanced by reduction of the number of components comprising the decorative portion.

Yet a further aspect of the invention is the provision of a tire having a decorative applique and the process for making the same in which the sidewall construction is uniform, with no interruptions or changes of materials or modulus therein.

Still a further aspect of the invention is the provision of a tire having a decorative applique and the process for making the same in which the applique is actually cured or vulcanized to the tire.

Another aspect of the invention is the provision of a tire having a decorative applique and the process for making the same wherein a ribbon of composite material is fed from a spool for forming an applique within a tire curing mold.

An additional aspect of the invention is the provision of a tire having a decorative applique and the process for making the same wherein a ribbon of composite material is formed into a ring, cut and spliced, and then, through the use of a transfer device, is introduced into a tire mold.

The foregoing and other aspects of the invention are achieved by an assembly for applying decorative pieces to the sidewall of a tire during a molding and curing operation, comprising: a substrate; and an applique removably received upon said substrate, said applique being adapted for bonding to the sidewall of the tire by concurrent curing of the tire and applique.

Still further aspects of the invention are obtained by a process for applying decorative pieces to a sidewall of a tire, comprising the steps of: forming an applique upon a substrate; positioning said applique and substrate upon a sidewall of a tire with said applique in contact with said sidewall of said tire; curing said tire and applique with a tire mold and thereby bonding said applique to said tire sidewall; and removing said substrate from said applique.

Other aspects of the invention are attained by a tire assembly, comprising: a sidewall area having a zone thereon separated from a remaining portion of said sidewall area; and an applique received upon said zone.

Yet further aspects of the invention are achieved by a process for manufacturing a tire with a decorative sidewall, comprising: forming an applique on a surface; engaging said applique with the sidewall of the tire; and transferring said applique from said surface to the sidewall.

BRIEF DESCRIPTION OF THE DRAWINGS

For a complete understanding of the objects, techniques and structure of the invention reference should be had to the following detailed description and accompanying drawing wherein:

FIG. 1 is a cross sectional view of an applique ribbon according to the invention;

FIG. 2 is a partial cross sectional view of a tire sidewall shown receiving the applique of FIG. 1;

FIG. 3 is an illustrative drawing of an apparatus for applying the applique ribbon of FIG. 1 directly to a tire mold;

FIG. 5 is a schematic drawing of an apparatus for forming an applique from the ribbon of FIG. 1 upon a white sidewall forming fixture;

FIG. 6 is an illustration of the turntable in conjunction with the ribbon-laying rolls of FIG. 5; and FIG. 7 is a cross sectional view of a splice of an applique formed by the apparatus of FIG. 5.

BEST MODE FOR CARRYING OUT THE INVENTION

Figure 4:
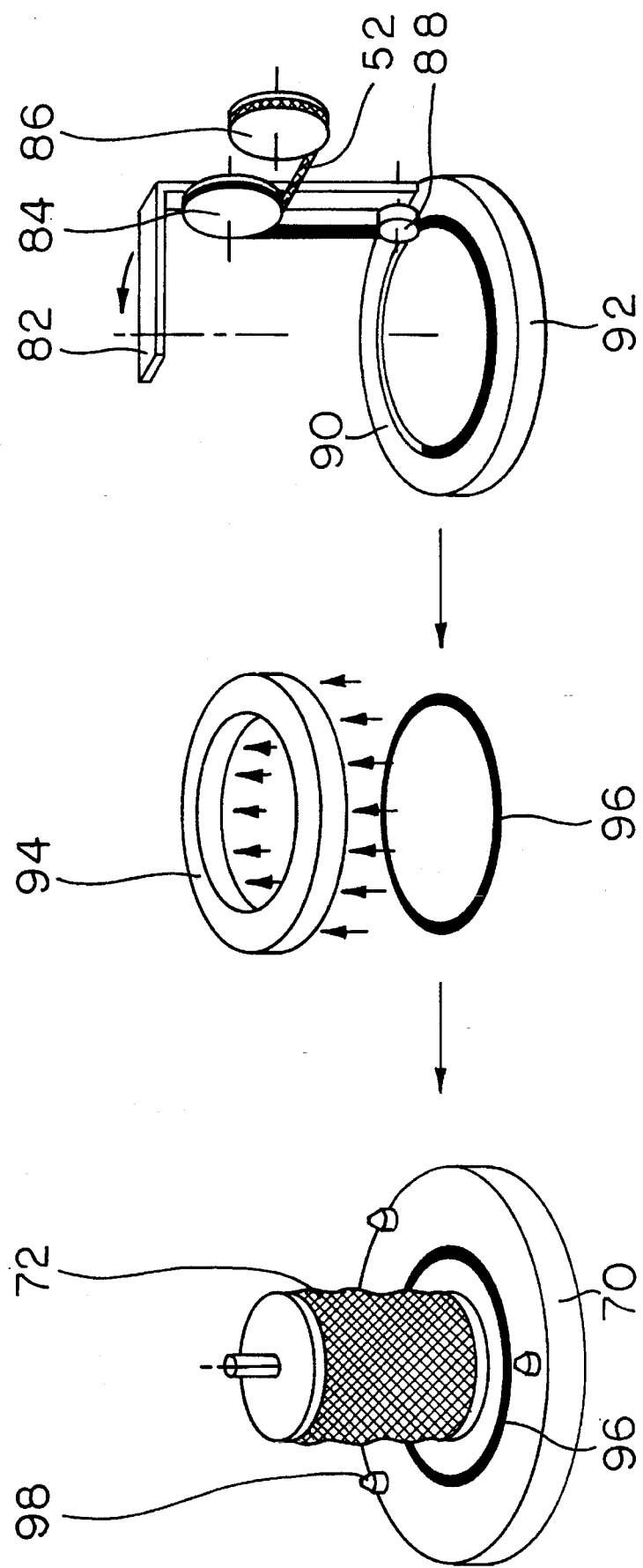
FIG. 4 is an illustrative drawing of an apparatus for forming an applique from the ribbon of FIG. 1 for subsequent transfer to a tire mold.

The invention contemplates the utilization of a ribbon of applique material which may be either laid directly into a tire mold or, alternatively, be formed upon a transfer ring or device for subsequent placement into the mold. FIG. 1 presents a cross-sectional view of such an applique ribbon or tape 50. As shown, the ribbon 50 includes a carrier or release liner 52 which receives thereupon a barrier layer 54 which, in turn, receives a white or decorative outer layer 56. In a preferred embodiment of the invention, the release liner 52 is a thin polymeric film having a thickness of 0.001–0.004 inch and, most preferably, 0.002 inch. The barrier layer 54 is provided to prevent the transfer therethrough of antioxidants and/or other staining or discoloring pigments in tire sidewall stocks. This barrier layer preferably is comprised of chlorobutyl-containing rubber compounds or any halobutyl-containing rubber stock. It has also been found that vinyl alcohol copolymers and epichlorhydrin copolymers may serve the desired purpose. While it has previously been known to use these materials as an air or oxygen barrier, it has not been known to use the same for a barrier for antioxidants, antiozonants or other rubber additives. Finally, the white or decorative outer layer 56 is preferably a conventional white sidewall composite such as a mix of EPDM and chlorobutyl rubber or zinc methacrylate based composite. It is most preferred that the combination of the layers 54,56 are uncured or only partially cured to a degree necessary to facilitate handling. This uncured or partially cured state allows for ease of vulcanization bonding to the tire during the curing process as will be discussed hereinafter.

The barrier layer 54 and decorative layer 56 are preferably of the same width, and it is further desired that the carrier release liner 52 is also of such width. In other words, the liner and layers 52–56 are preferably congruent. In the preferred embodiment, the barrier layer 54 has a thickness of 0.01–0.07 inch, and preferably 0.03 inch. The decorative layer 56 is a thickness of 0.03–0.10 inch, and preferably 0.055 inch. The width of the ribbon 50 and the constituent layers and liner is on the order of 0.3–1.0 inch, and preferably 0.55 inch.

As shown in FIG. 2, the ribbon of FIG. 1, having the release liner 52 removed, may be used to form a decorative applique on the sidewall of a tire 58. Preferably, a tire employing this type of applique will include an inner rib 60 positioned on the side of the applique nearest the tire bead, and an outer rib 62 on the side of the applique nearest the tread. A raised land or plateau 64 is maintained between the two ribs and separated therefrom by respective separation grooves 66,68. These grooves have a width on the order of 0.03–0.10 inch, and most preferably, 0.06 inch. The purpose of these separation grooves is to prevent bleeding from the tire sidewall 58 into the side edges of the decorative layer 56. Accordingly, the decorative layer 56 is protected from the tire on the bottom by the barrier layer 54 and on the sides by the gaps defined by the grooves 66,68.

It will be appreciated that the barrier layer 54 is black rubber and serves to mate with a correspondingly black tire. During the curing operation, any flow of the laminate 54,56 will be at the interface between the tire 58 and the laminate 54,56. Flow from the bonding surface between the barrier layer 54 and the land 64 is black in color and therefore undetectable. Accordingly, the decorative surface 56 has a characteristic clean, crisp, and well defined appearance. It will, of course, be appreciated that a tire mold used in accordance with the invention includes a sidewall configuration which forms the grooves 66,68 and the ribs 60,62, while accommodating the laminate 54,56.

It is also contemplated within the invention to form the portion of the sidewall of the tire 58 of a nonstaining black rubber compound formed as an inlay to the sidewall of the tire 58 and constituting substantially that portion shown in FIG. 2. In other words, at least the land 64 and the ribs 60,62 would be formed of such a nonstaining rubber composition. In such a case, the laminate applique ribbon or tape 50 would be the same as in FIG. 1, but the layer 54 would no longer need to be a barrier layer, but could simply be formed of any suitable nonstaining black rubber compound employed in tire manufacture. The black layer 54 would still serve the purpose of assuring that the decorative layer 56 maintains its characteristic clean, crisp, and well defined appearance as discussed above.

A first concept of this embodiment of the invention anticipates the application of the applique ribbon or tape 50 directly to the tire mold itself. This concept is best shown in FIG. 3 wherein a tire mold 70, having a typical bag or bladder 72 maintained therein is characterized by the presence of a rotatable frame member 74. The frame 74 is adapted for rotation about the center of the tire mold 70 and carries thereon a spool 76 of the ribbon 50. A take-up roll 78 is provided for stripping the release liner 52 from the ribbon 50. An application roller 80 is maintained at the bottom of the frame 74 and in ribbon-applying engagement with the tire mold 70. The application roller 80 rolls the applique composite 54,56 into a groove in the mold 70, cuts an appropriate length of the composite, and splices the same at the two ends to define a ring-like applique as typifies a "white sidewall" tire. After the applique has been placed or layed in the mold groove, cut and spliced, the rotatable frame member 74 and the attached reels 76,78 and roller 80 are removed from the mold.

In FIG. 4, there is shown an apparatus and technique for prefabricating an applique from the ribbon 50 apart from the tire mold, for subsequent movement to and placement of the applique within the tire mold. As shown, a frame 82 is again adapted for rotation about a center point. The frame 82 carries a spool 84 of ribbon 50 and includes a take-up roll 86 for stripping and receiving the release liner 52 from the ribbon. An application roller 88 is maintained at the bottom of the frame 82 for purposes of urging the composite 54,56 into a cavity 90 of the forming fixture or disk 92. It should be noted at this time that the fixture or disk 92 might itself be rotatable while the frame 82 remains fixed. In either event, relative rotation between the two elements is necessary to place the applique into the cavity 90.

Once the applique has been formed in the cavity 90, appropriately cut and spliced, the frame 82 is pivoted away from the fixture 92 and an appropriate transfer device such as the vacuum ring 94 moves over the fixture 92 for purposes of removing the formed applique such that a subsequent applique may be fabricated. The vacuum ring 94 simply comprises an annular disk having a plurality of aperatures in a bottom surface thereof and appropriately connected to a vacuum source. The ring 94 is placed over the applique within the cavity 90 and makes a securing engagement therewith, subsequently lifting the applique from the cavity 90 for movement to the tire mold 70. The applique 96, comprising layers 54,56 is maintained by vacuum upon the bottom surface of the vacuum ring transfer device 94 and is assisted into position within the tire mold 70 by means of appropriately positioned guide pins 98. At that point, the vacuum is terminated and the applique 96 is released into an appropriate groove in the mold 70. Obviously, the vacuum ring transfer device 94 is appropriately pivotal or moveable to accomplish this feature. After placement in the tire mold, a green tire is placed therein, the bag 72 inflated, the mold closed, and standard curing processes are employed. At that time, the applique 96 is bonded by vulcanization to the tire sidewall.

It should be appreciated that the fixture 92 could be an annular ring or disk adapted to be retrieved by the vacuum ring transfer device 94 and maintained along with other similar rings or disks in an appropriate cassette or stack for placement into the tire mold 70. In other words, a new ring or disk 92 would be placed in association with the frame 82 each time an applique 96 was to be formed. After forming, the ring 92 carrying the applique 96 would be retrieved and stored for eventual placement in association with a tire mold. At that time, the entire ring, carrying the applique 96, could be placed within the mold 70 as by a vacuum ring transfer device 94, or could be subsequently stripped from the ring 92 such that only the applique 96 is placed within the mold.

Irrespective of whether the applique is formed within the tire mold or apart from the tire mold, the key to the concept of this embodiment of the invention is the ability to form and splice a sidewall applique into a circular configuration. In general, such a forming method can be achieved by the structure shown hereinafter with respect to FIGS. 5–7.

As shown in FIG. 5, an applique forming system is designated generally by the numeral 100. A spool 102 maintaining ribbon 50 thereon is provided as part and parcel of the system. As will be appreciated, the spool 102 is an idler spool, and only rotates when the ribbon 50 is drawn therefrom. A driven roller 104 also serves as a take-up roller to strip the liner 52 from the ribbon 50. A spring-biased idle roller 106 is maintained in juxtaposition to the roller 104 such that the composite 54,56 passes thereover once the liner 52 has been removed.

The composite 54,56 passes between limit switches 108. These limit switches assure that the proper tension is maintained in the traveling web of the composite 54,56 to prevent stretching or shrinking thereof. The top switch, if contacted, indicates that the speed of the web should be slowed down, while the bottom switch, if contacted, indicates that the speed of the web should be increased. By maintaining the web between the two limit switches 108, proper tension is maintained within the web.

The web of material then passes between a nip roller 110 and a ribbon laying head or roller 116. The nip roller 110 is received within a groove 112 formed between the side disks 114 of the roller 116. The depth of the groove 112 is substantially equal to the thickness to the composite 54,56. The side disks 114 are spaced apart a distance substantially equivalent to the width of the composite 54,56 to maintain the composite in a well defined posture.

The composite 54,56 travels about the roller 116 and then between the guide wheels 120 and the drive roll 118. The guide wheels 120 are provided to maintain alignment and registration of the ribbon composite 54,56. A cutting knife 122 which is spring loaded, and which may also be heated, is positioned in juxtaposition to the drive roll 118. The drive roll 118 is indexed so that the amount of composite ribbon 54,56 laid off of the roll 118 may be accurately measured. When an appropriate length has been laid, the knife 122 is actuated to cut the ribbon 54,56 at the appropriate point and angle.

As shown in FIG. 6, the drive roll 118 lays the composite 54,56 onto a white sidewall forming device 124. It will be appreciated that the white sidewall forming device 124 may carry a ring which may be removed with the applique secured thereto for storage in a cassette adjacent to the tire molds. When required by the mold, robotic removal from the cassette and application to the tire mold may be achieved as is within the capabilities of those skilled in the art.

As just mentioned, a turntable 128 is provided for receiving the white sidewall forming device 124. Accordingly, the turntable rotates to receive the composite 54,56 from the wheel 118. Obviously, the turntable 128 and roller 118 are appropriately geared or indexed together such that the feed rate of the web 54,56 thereonto is proper and appropriate.

As shown in FIG. 7, the splicing of the composite 54,56 is achieved by the knife 122 making a cut through the thickness of the composite at an appropriate angle for a mitered fit, typically less than 90°. Since the composite 54,56 is comprised of uncured rubber, the ends of the splice readily mate with each other and join for subsequent curing. By making an appropriate angled cut with the knife 122, the splice 126 is not only uniform, but each cut of the composite 54,56 defines a new beginning for the subsequent applique formation such that no waste is experienced in the operation.

Thus it can be seen that the objects of the invention have been satisified by the structure presented hereinabove. While in accordance with the patent statutes the best mode and preferred embodiments of the invention have been presented and described in detail, it is to be understood that the invention is not limited thereto or thereby. Accordingly, for an appreciation of the true scope and breadth of the invention reference should be had to the following claims.

What is claimed is:

1. Apparatus for forming a decorative applique on the sidewall of a tire during tire cure, comprising:

a spool of laminate material received upon a carrier, said laminate material comprising a barrier layer receiving a decorative layer;

a fixture;

first means interconnected between said spool and said fixture for effecting relative rotation therebetween and for stripping said carrier from said laminate material and laying said laminate material from said spool onto said fixture in the form of an applique;

a tire mold; and transfer means operatively interposed between said fixture and said tire mold for securing and removing said applique from said first means and depositing said applique in said tire mold, said tire transfer means comprising a vacuum ring securing and transporting said fixture to said tire mold, and placing said fixture and applique into said tire mold, said fixture comprising a disc having a cavity receiving said applique, said cavity defining a geometric configuration of said applique, said tire mold comprising second means for positioning said vacuum ring for assuring proper positioning of said fixture and applique in said tire mold.

2. The apparatus according to claim 1, wherein said first means comprises an application roller engaging said laminate and urging it onto said fixture, said fixture having a cavity receiving said laminate.

3. The apparatus according to claim 2, wherein said first means further comprises a take up roller stripping said carrier from said laminate material.

4. The apparatus according to claim 3, wherein said spool of laminate material, application roller, and take up roller are carried by a frame.

5. The apparatus according to claim 4, wherein said frame rotates about said fixture.

6. The apparatus according to claim 4, wherein said frame is stationary and said fixture rotates about an axis.

* * * * *